March 11, 1941. H. F. JORDAN 2,234,842
PROCESS FOR PRODUCING PERFORATE FILMS OR SHEETS
Filed Aug. 22, 1939
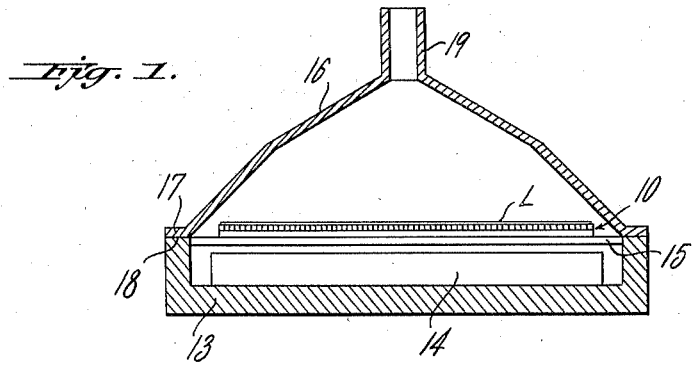
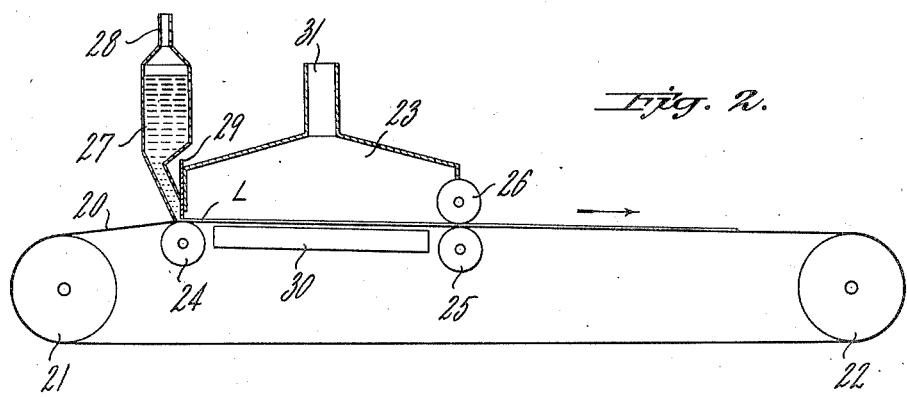
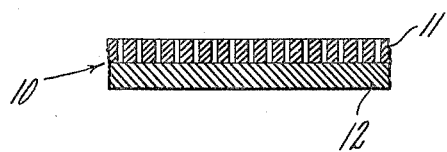
INVENTOR.
HUBERT F. JORDAN
BY
ATTORNEYS Patented Mar. 11, 1941

2,234,842

UNITED STATES PATENT OFFICE 2,234,842

PROCESS FOR PRODUCING PERFORATE FILMS OR SHEETS

Hubert F. Jordan, Nutley, N. J., assignor to United States Rubber Company, New York, N. Y., a corporation of New Jersey Application August 22, 1939, Serial No. 291,307

6 Claims. (Cl. 18—57)

This invention relates to a process for producing perforate films or sheets and more particularly perforate films or sheets derived directly from fluid film-forming substances, for example, latex.

The present invention is an improvement over the process of making perforate films or sheets disclosed in the patent to Linscott and Rice No. 2,032,942, granted March 3, 1936. By the prior process of Linscott and Rice, a perforate rubber film or sheet, for example, is made by spreading a latex composition on an air impermeable deposition backing having cavities or pits in its deposition surface in such a manner as to entrap air in the cavities or pits between the latex coating and the backing, and then heating the backing so as to cause the entrapped air to expand and force its way through the latex coating while concurrently drying or gelling the latex to form permanent perforations therein. In this prior method, the size of the holes and the thickness of the coating which can be perforated in one cycle of operations are limited by the obtainable degree of expansion of the air entrapped in the cavities which is in turn limited by the temperature rise to which the blanket and its associated coating can be subjected. Under the usual operating conditions of the process of the Linscott and Rice patent, the expansion of the entrapped air is generally somewhat under 50%.

According to the present invention there can readily be obtained expansions of the entrapped gas of two to as much as ten fold, i. e., 200% to 1000% expansion. The ability to obtain such large expansions results in numerous advantages. The cavities in the deposition surface may be of larger cross section and need not be as deep as is necessary with the process of the prior patent. Furthermore, it is possible to perforate thicker coatings of latex and other film-forming material, and hence to build up a perforate sheet material of a given thickness in a lesser number of spreading cycles.

In the drawing:

Figure 1 illustrates more or less diagrammatically apparatus for producing perforate sheeting by a discontinuous process;

Fig. 2 illustrates more or less diagrammatically apparatus for producing perforate sheeting by a somewhat continuous process; and Fig. 3 is an enlarged view of a cross section of an example of deposition backing as used in the apparatus of Figs. 1 and 2.

By way of illustration only, and without intention to unduly limit the invention, the manufacture of perforate flat rubber sheeting from latex will be described in detail, it being obvious that articles of other materials and of any desired shape, other than flat sheeting, may be made using the required shape of air-impermeable deposition backing having cavities or pits in the deposition surface thereof.

According to the present invention, the perforate rubber sheeting is made by spreading a latex composition on an air impermeable deposition backing having cavities or pits in the deposition surface so as to entrap air in the cavities or pits. The latex need only be of such viscosity that it will bridge over and not run down into the cavities or pits of the deposition surface. So far this is similar to the practice of the Linscott and Rice patent. The pressure on the exposed surface of the latex coating is then reduced by placing the coated deposition backing in an evacuated chamber whereupon the gas entrapped within the cavities or pits expands and forces its way through the latex, thereby forming minute perforations in the same. In order to permanently fix these perforations in the coating, the coating is dried or gelled concurrently with the reduction of pressure on the exposed surface of the coating and the resultant expansion of the air. The vacuum chamber preferably has a heating unit associated with it so that the latex may be dried sufficiently during the expansion of the air to fix the perforations in the rubber film, or, in the case of a heat-sensitive latex, so that the latex may be gelled to a more or less rigid condition with little or no loss of water by evaporation. The latex may be made heat sensitive in a known manner by the addition thereto of a small amount of a heat-sensitizing agent, such as a polyvalent metal salt, or a di-substituted guanidine, or a mixture of zinc oxide and an ammonium salt of a strong acid. The latex may also be heat-sensitized in a known manner by the addition thereto of a small amount of a compound that forms an acid on heat decomposition, such as ammonium persulphate, or by the addition of a material such as sodium silico-fluoride which, in addition to sensitizing the latex to heat, also acts as a delayed coagulant and will cause it to gel on standing at room temperature. With a delayed coagulant, such as sodium silico-fluoride, the evacuated chamber need not be associated with a heating unit, and the latex may be made to gel at room temperature concurrently with the reduction in pressure and expansion of the air.

The deposition backing may be made as described in the Linscott and Rice Patent 2,032,942, or it may be a laminated deposition surface comprising a ply of perforate sheet rubber and a ply of impervious sheet rubber cemented to it, as described and claimed in the application of McGavack and Linscott, Serial No. 273,448, and as illustrated in Fig. 3 of the present drawing. Mechanical methods of forming the pits or cavities in the deposition surface may be utilized, particularly with shaped deposition backings for the production of other than flat sheeting material.

The operations of spreading the latex without filling up the cavities, and reducing the pressure on an exposed surface of the latex coating and concurrently drying or gelling the latex, may be repeated until the desired thickness of coating has been built up, after which the completed coating may be dried, stripped from the backing, and, if vulcanization has not previously been accomplished, vulcanized in any convenient manner.

The term "latex" is used herein to designate broadly aqueous dispersions of elastic materials, including artificial dispersions of natural rubber, synthetic rubber and rubber-like materials, rubber substitutes and the like, as well as natural latex which may be preserved or compounded or otherwise treated as desired, as by vulcanization, and which may be in a normal, diluted, concentrated or purified condition. The invention, however, is not limited to the manufacture of perforate rubber films or sheets from latex, but may readily be utilized to make perforate films or sheets from solutions or dispersions of such materials as rubber hydrochloride, rubber chloride, cellulose acetate, cellulose nitrate, synthetic resins, varnish films and the like. It is only necessary that the dispersions or solutions of these materials should be of such voscosity that they will bridge over, and not run down into, the cavities or pits in the deposition surface. The viscosity of these dispersions or solutions may readily be controlled either by variations in the nature of the liquid medium in which they are dissolved or dispersed, or by varying the concentration of the solution or the dispersion, or by adding materials that increase the viscosity, as desired.

Referring more particularly to the drawing, Figure 1 illustrates more or less diagrammatically apparatus for producing perforate films or sheets by a discontinuous process. 10 represents a cavitied deposition surface, which, in the case of preparing perforate rubber sheets from latex, may be made as shown in detail in Fig. 3, by laminating a perforate rubber sheet 11 to an impervious rubber sheet 12. The perforate sheet 11 may be made in any desired manner, as by mechanical perforating, or by the process of the Linscott and Rice Patent 2,032,942, or by the process of the present invention. The laminated rubber deposition surface is preferably treated with a halogenating or oxidizing agent to render it as completely as possible non-adherent to a dried latex film. The deposition surface may be an integral part of the base of the vacuum chamber, or may be separate and placed on the base before or after being spread with the latex.

The vacuum chamber includes a base 13 containing a heating unit 14 above which rests the deposition backing 10 as on the support 15. The top of the chamber which is removable from the base is in the form of an open bottomed hood 16 which rests in air tight contact at its circumferential flange 17 with the edge of the base 13. The top of the hood is connected as at 19 with a vacuum pump (not shown).

In operation, a coating of a fluid film-forming substance, for example latex, is applied to the deposition surface of the cavitied deposition backing 10 by a spraying, dipping, or mechanical spreading operation, in such a manner that the cavities of the deposition surface are covered over but not filled up. The deposition surface is coated with the latex and placed on the support 10 15 of the base 13, the top 16 is placed on the base, and the pressure in the chamber is reduced as by an air-pump or other pressure reducing means connected to the top at 19. As the pressure within the chamber is reduced, the air entrapped in the cavities on the deposition surface expands and forces its way through the coating of latex which is being concurrently dried or gelled by means of the heating unit 14 so that the perforations made by the air forcing its way through the coating are made permanent. The operations may be repeated until the desired thickness of perforate sheet has been obtained, after which it may be further dried, if necessary, and stripped from the deposition backing.

Fig. 2 illustrates a more or less continuous process wherein the deposition surface 20 is in the form of a continuous belt constructed as shown in Fig. 3 and as described in detail above with reference to the discontinuous process of Fig. 1. The endless cavitied deposition surface 20 is trained about drive rolls 21 and 22, and passes through an essentially air-tight chamber 23. The lower surface of the deposition backing bears on guide rolls 24 and 25 at the ingress and egress ends of the chamber 23. A guide roll 26 at the egress end of the chamber 23 above the guide roll 25 bears on the deposition surface of the deposition backing and acts with guide roll 25 to maintain the inflow of air at the egress end of the chamber 23 at a minimum when the chamber is under reduced pressure. The latex spreading device at the ingress end of the drier 23 consists of a latex reservoir 27 connected at the top 28 to a pressure reducing means (not shown). The reservoir feeds latex onto the deposition surface 20 immediately in advance of a spreader bar 29, which regulates the thickness of the latex deposit on the deposition surface, and which acts with the guide roll 24 to maintain the inflow of air at the ingress end of the chamber 23 at a minimum when the chamber is under reduced pressure. Beneath the chamber 23 is a heating unit 30 for drying or gelling the latex or other fluid film-forming substance on the belt 20, and is also connected at 31 to a pressure reducing means (not shown). The clearances between the guide rolls 24, 25 and 26, and the surfaces of the deposition blanket should be sufficiently small so that the rate of flow of air through these clearances will not be substantially greater than the rate at which it can be removed by the pressure-reducing means when the pressure within the chamber is at any desired pressure less than atmospheric. These conditions can be met providing the pressure-reducing means has a sufficiently high rate of pumping and providing care is taken to keep the clearances about the rolls as small as is consistent with good operation.

In the operation of the apparatus of Fig. 2 where the desired number of coatings may be made as a continuous operation on an endless deposition backing or belt, the fluid forming substance, such as latex, is spread onto the traveling belt from the reservoir 27 by means of the spreader bar 29. The pressure on the reservoir 27 may be adjusted through the pressure reducing means conected at 28 so that the latex is delivered to the traveling deposition surface in front of the spreader bar at the desired rate. The coated deposition surface or belt 20 then passes into the chamber 23, wherein a pressure lower than atmospheric is maintained by means of pressure reducing means, such as a vacuum pump connected to the pipe 31. The air which has been entrapped in the cavities of the deposition surface and which is approximately at atmospheric pressure, expands and forces its way through the coating of latex which is being concurrently dried or gelled as it passes over the heating unit 30 so that the perforations made by the air forcing its way through the coating are made permanent. The latex may be merely gelled in the vacuum chamber 23 by means of heat supplied by the heating unit 30 or it may be partly or completely dried as well. It is often preferable to gel the latex in the vacuum chamber with a minimum of drying so as to obtain better adhesion between the first film and the rubber deposit applied on top of it. As the deposition belt with the more or less dried perforate rubber deposit on it passes under the spreader mchanism, another coat of latex is applied and the operations may be repeated until the desired thickness of perforate sheet has been obtained, after which it may be further dried before or after stripping from the belt, with a subsequent vulcanization if necessary.

In view of the many changes and modifications that may be made without departing from the principles underlying the invention, reference should be made to the appended claims for an understanding of the scope of the invention.

Having thus described my invention, what I claim and desire to protect by Letters Patent, is:

1. A process for producing a rubber film or sheet having a plurality of perforations therethrough comprising applying a latex composition on an air impermeable deposition backing having cavities or pits in the deposition surface thereof so as to entrap air between the latex coating and the backing in the said cavities or pits, and reducing the pressure on the exposed surface of the latex coating to cause the entrapped air to expand and force its way through the latex coating and concurrently drying or gelling the latex coating to form permanent perforations therein.

2. A process for producing a rubber film or sheet having a plurality of perforations therethrough comprising applying a latex composition on an air impermeable deposition backing having cavities or pits in the deposition surface thereof so as to entrap air between the latex coating and the backing in the said cavities or pits, reducing the pressure on the exposed surface of the latex coating to cause the entrapped air to expand and force its way through the latex coating and concurrently drying or gelling the latex coating to form permanent perforations therein, and removing the perforate film or sheet from the backing.

3. A process for producing a rubber film or sheet having a plurality of perforations therethrough comprising applying a latex composition on an air impermeable deposition backing having cavities or pits in the deposition surface thereof so as to entrap air between the latex coating and the backing in the said cavities or pits, reducing the pressure on the exposed surface of the latex coating to cause the entrapped air to expand and force its way through the latex coating and concurrently drying or gelling the latex coating to form permanent perforations therein, repeating the operations until the desired thickness of rubber film or sheet has been obtained, and removing the perforate film or sheet from the backing.

4. A process for producing a perforate film or sheet comprising applying a fluid film-forming substance on an air impermeable deposition backing having cavities or pits in the deposition surface thereof so as to entrap air between the coating of film-forming substance and the backing in the said cavities or pits, and reducing the pressure on the exposed surface of the coating to cause the entrapped air to expand and force its way through the coating and concurrently drying or gelling the coating to form permanent perforations therein.

5. A process for producing a perforate film or sheet comprising applying a fluid film-forming substance on an air impermeable deposition backing having cavities or pits in the deposition surface thereof so as to entrap air between the coating of film-forming substance and the backing in the said cavities or pits, reducing the pressure on the exposed surface of the coating to cause the entrapped air to expand and force its way through the coating and concurrently drying or gelling the coating to form permanent perforations therein, and removing the perforate sheet from the backing.

6. A process for producing a perforate film or sheet comprising applying a fluid film-forming substance on an air impermeable deposition backing having cavities or pits in the deposition surface thereof so as to entrap air between the coating of film-forming substance and the backing in the said cavities or pits, reducing the pressure on the exposed surface of the coating to cause the entrapped air to expand and force its way through the coating and concurrently drying or gelling the coating to form permanent perforations therein, repeating the operations until the desired thickness of film or sheet has been obtained, and removing the perforate film or sheet from the backing.

HUBERT F. JORDAN.